United States Patent [19]

Becker, deceased et al.

[11] Patent Number: 4,730,889
[45] Date of Patent: Mar. 15, 1988

[54] PLUG CONNECTOR FOR A LIGHT CONDUCTOR UTILIZING TWO-POINT CONTACT

[75] Inventors: Hans D. Becker, deceased, late of Königsbronn; Christa Becker, heir, Heidenheim; Volkmar Binder, Aalen, all of Fed. Rep. of Germany

[73] Assignee: Carl-Zeiss-Stiftung, Heidenheim, Fed. Rep. of Germany

[21] Appl. No.: 941,417

[22] Filed: Dec. 15, 1986

[30] Foreign Application Priority Data

Dec. 14, 1985 [DE] Fed. Rep. of Germany ....... 8535264

[51] Int. Cl.$^4$ .................................................. G02B 6/36
[52] U.S. Cl. ................................ 350/96.20; 350/96.21
[58] Field of Search ................ 350/96.20, 96.21, 96.22

[56] References Cited

U.S. PATENT DOCUMENTS

| | | | |
|---|---|---|---|
| 4,146,300 | 3/1979 | Kaiser | 350/96.21 |
| 4,258,977 | 3/1981 | Lukas et al. | 350/96.21 |
| 4,354,731 | 10/1982 | Mouissie | 350/96.21 |
| 4,557,554 | 12/1985 | Blanc | 350/96.2 |

FOREIGN PATENT DOCUMENTS

| | | | |
|---|---|---|---|
| 2461964 | 3/1981 | France | 350/96.2 |
| 0025647 | 2/1977 | Japan | 350/96.21 |

Primary Examiner—John Lee
Assistant Examiner—John Ngo
Attorney, Agent, or Firm—Walter Ottesen

[57] ABSTRACT

A plug connector for a light conductor includes a plug pin having a longitudinal pin axis connected to the end of the light conductor so as to be coaxially therewith. A plug housing has a receiving bore formed therein for receiving the plug pin therein. A fixing arrangement fixes the plug pin in position in the receiving bore. This fixing arrangement includes two longitudinal grooves formed in the wall of the receiving bore so as to be disposed one behind the other and spaced a predetermined distance from each other. Two press pins are movably mounted in the housing so as to lie opposite the approximate centers of corresponding ones of the grooves. A latching member mounted on the housing is movable between first and second positions. The latching member and the housing conjointly define a space for accommodating an intermediate piece directly above the two press pins. An abutment structure is provided for imparting a force to the intermediate piece when the latching member is moved into its second position so as to cause the intermediate piece to engage and press the press pins against the plug pin thereby clamping the latter against the grooves to fix the plug pin in position in the receiving bore. The plug connection provides a very good reproducibility of the fixation of the axis of the light conductor. In addition, the plug connector ensures a permanent constancy of the axis of the conductor even when the light conductor is mechanically stressed externally of the plug connector.

7 Claims, 4 Drawing Figures

PLUG CONNECTOR FOR A LIGHT CONDUCTOR UTILIZING TWO-POINT CONTACT

FIELD OF THE INVENTION

The invention relates to a plug connector for a light conductor having a plug pin attached centrally to the end of the light conductor.

BACKGROUND OF THE INVENTION

A great many apparatus are known for optically connecting two light conductors. In such apparatus, it is always decisive that the axial displacement or offset of both light conductors with respect to each other be as little as possible.

With measuring apparatus, it has become increasingly important to be able to connect a light conductor to the housing of the measuring apparatus. For this purpose, it is not only important that a good reproducibility of the positioning of the end of the light conductor be provided; however, it is also important that the spatial alignment of the axis of the light conductor be precise.

It is common that the ends of the light conductors be held in plug pins which are produced with high precision.

German patent No. 29 31 018 discloses a plug connector for connecting two light conductors wherein the plug pin is inserted into a receiving bore of a plug housing and is fixed therein. A longitudinal groove is machined into the wall of the receiving bore and a pressure piece is mounted on the opposite side for each plug pin. The pressure piece is pressed against the inserted plug pin by a sleeve nut threadably engaging the plug housing. The sleeve nut presses the pressure piece against the plug pin by means of a resiliently journalled pin and in this way fixes the plug pin against the edges of the longitudinal groove.

This known device makes possible a sufficiently precise fixation of two light conductors with respect to each other. However, it does not make possible a satisfactorily precise fixation of the axis of a light conductor which is connected to a measuring apparatus such as a diode-array spectrometer. This is especially the case when the light conductor is mechanically stressed outside of the plug connector.

SUMMARY OF THE INVENTION

It is an object of the invention to provide a plug connector for a light conductor which provides a very good reproducibility of the fixation of the axis of the light conductor. It is a further object of the invention to provide such a plug connector which also ensures a permanent constancy of the axis of the conductor even when the light conductor is mechanically stressed externally of the plug connector.

According to a feature of the plug connector of the invention, two longitudinal grooves are machined into the wall of a receiving bore and are separated from each other by a predetermined distance. A press pin is provided for each longitudinal groove and is mounted opposite approximately the center of the groove. Each of the press pins has an outer end face facing away from the plug pin. The press pins are pressed against the inserted plug pin at their outer end faces by means of a yoke-shaped intermediate piece and a ball via a conical surface on the sleeve nut.

In an advantageous embodiment of the invention, the width of the longitudinal groove is so selected that the connecting planes between the edges of the longitudinal groove and the center axis of the inserted plug pin conjointly define an angle of approximately 90°.

BRIEF DESCRIPTION OF THE DRAWING

The invention will now be described with reference to the drawing wherein.

DESCRIPTION OF THE PREFERRED EMBODIMENTS OF THE INVENTION

Figure 1:
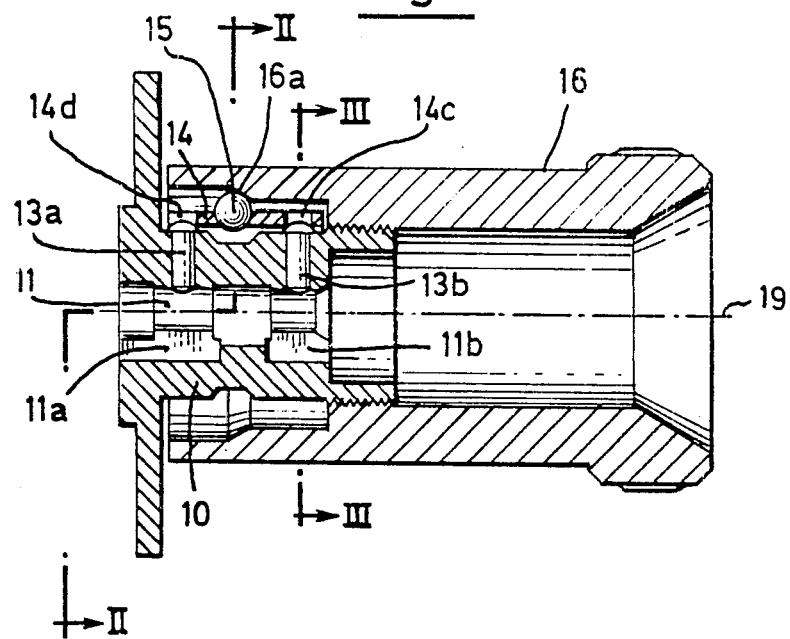
FIG. 1 is a side elevation view, in section, of a plug connector according to the invention at a scale of twice full size.
Figure 2:
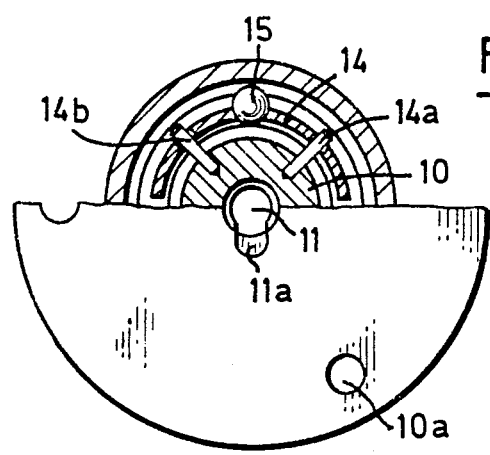
FIG. 2 is a section view taken along line II—II of FIG. 1.
Figure 3:
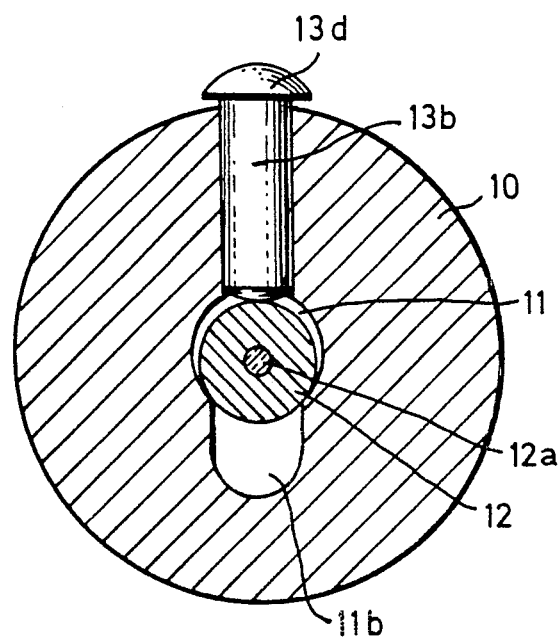
FIG. 3 is a partial section view at a scale of 6:1 taken along line III—III of FIG. 1; and, FIG. 4 is a portion taken out of FIG. 1 with another embodiment of the yoke-shaped intermediate piece and a rubber ring.

In all of the figures, the connector housing 10 is shown which has a receiving bore 11 into which the plug pin 12 with the light conductor 12a is inserted. Two longitudinal grooves (11a, 11b) are milled into the wall of the receiving bore 11 with an end mill so as to be precisely aligned with respect to each other and precisely opposite these grooves respective bores are arranged so that they are each approximately at the middle of the grooves. Press pins (13a, 13b) are seated in corresponding ones of the bores. These press pins have rounded heads 13d with the largest cross section of the latter being larger than the cross section of the bores so that the press pins (13a, 13b) cannot fall into the receiving bore 11 when the plug pin 12 is withdrawn.

A yoke-shaped intermediate piece 14 lies atop the rounded heads of the press pins (13a, 13b). The intermediate piece 14 is in the form of a longitudinal section of a cylinder and is loosely connected to the plug housing 10 by means of pins (14a, 14b) which are seated tightly in the housing 10. The yoke-shaped intermediate piece 14 has a bore 14c and a slot 14d into which the rounded heads of the press pins (13a, 13b) engage. Approximately in the center between bore 14c and slot 14d, a ball 15 is seated in the yoke-shaped intermediate piece 14. A force component in the direction of the center axis 19 is imparted to the ball 15 by the conical surface 16a of the sleeve nut 16 when the latter is tightened. This force component is transmitted approximately evenly onto both press pins (13a, 13b) by means of the yoke-shaped intermediate piece 14 so that the plug pin 12 is at least approximately uniformly pressed into both grooves (11a, 11b) and thereby effects a good reproducible alignment of the axis of the plug pin 12 with the light conductor 12a.

Figure 4:
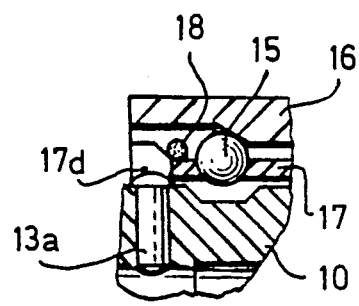

FIG. 4 shows an advantageous further embodiment of the invention. In this embodiment, the yoke-shaped intermediate piece 17 is enlarged with respect to its diameter at its end 17d and between this enlargement and the ball 15, a rubber ring 18 is mounted which is placed around the housing 10 and therefore pulls the yoke-shaped intermediate piece 17 against the housing 10 so that the two press pins (13a, 13b) are pressed into the receiving bore 11 as far as their larger diameter heads 13d permit.

With this embodiment, when one inserts the plug pin 12 into the receiving bore 11, one then senses a resistance at each press pin which, since it is caused by the rubber ring 18, can, however, be easily overcome. In this manner, one obtains information as to how far the plug pin is inserted each time and that the press pins (13a, 13b) are functioning correctly. It is understood that also in this embodiment, the plug pin will be correctly fixed when it is completely inserted by tightening the sleeve nut 16.

The precise positioning of the end face of the plug pin is effected by means of a mechanical abutment on that part (not shown) on which the plug housing 10 is attached with its openings 10a for example on a measuring apparatus. The positioning of the end face of the plug pin can also be achieved by means of an abutment in a correspondingly configured plug housing. The light conductor 12a can be made of a single light-conducting fiber or out of several or a multiplicity of light-conducting fibers.

An advantage of the above-described plug connector is that the fixation of the plug pin is achieved with a single rotational movement so that a one hand use thereof is possible.

It is understood that the foregoing description is that of the preferred embodiments of the invention and that various changes and modifications may be made thereto without departing from the spirit and scope of the invention as defined in the appended claims.

What is claimed is:

1. A plug connector for a light conductor having a longitudinal axis, the plug connector comprising:
   a plug pin having a longitudinal pin axis connected to the end of the light conductor so as to be coaxial therewith;
   a plug housing having a receiving bore formed therein for receiving said plug pin therein said bore defining a longitudinal axis; and,
   fixing means for fixing said plug pin in position in said receiving bore, said fixing means including:
   two longitudinal grooves formed in the wall of said receiving bore so as to be disposed one behind the other in the direction of said axis and spaced a predetermined distance from each other;
   two press pieces movably mounted in said housing so as to lie opposite the approximate centers of corresponding ones of said longitudinal grooves, said two press pieces having respective end faces facing away from said grooves;
   a latching member mounted on said housing so as to be movable between first and second positions in the direction of said pin axis, said latching member and said housing conjointly defining a space at the region of said press pieces;
   an intermediate piece movably mounted in said space between said housing and said latching member so as to be movable toward and away from said end faces of said press piecess; and,
   abutment means for imparting a force to said intermediate piece when said latching member is moved into said second position so as to cause said intermediate piece to engage and press both of said press pieces directly against said plug pin thereby clamping the latter against respective ones of said grooves to fix said plug pin in position in said receiving bore.

2. The plug connector of claim 1, said latching member being a sleeve nut threadably engaging said housing so as to be rotatable on said housing between said first and second positions; and, said abutment means including: a ball seated in said intermediate piece so as to project outwardly therefrom; and, a conical surface formed on said sleeve nut for contact engaging said ball to impart said force thereto.

3. The plug connector of claim 1, said space being an annular space and said intermediate piece having a yoke-like shape adapted to be accommodated in said annular space.

4. The plug connector of claim 1, said longitudinal grooves each defining two mutually adjacent groove edges and having a width selected so as to cause a first plane passing through one of said edges and said pin axis to define an angle of approximately ninety degrees with a second plane passing through the other one of said edges and said pin axis.

5. The plug connector of claim 1, comprising resilient means for resiliently biasing said intermediate piece against said end faces of said press pieces.

6. The plug connector of claim 5, said resilient means being a rubber ring mounted on said housing and placed over said intermediate piece so as to resiliently bias the latter against said press pieces at the respective end faces thereof.

7. A plug connector for a light conductor having a longitudinal axis, the plug connector comprising:
   a plug pin having a longitudinal pin axis connected to the end of the light conductor so as to be coaxial therewith;
   a plug housing having a receiving bore formed therein for receiving said plug pin therein, said bore defining a longitudinal axis, and,
   fixing means for fixing said plug pin in position in said receiving bore, said fixing means including:
   first and second support means formed on the wall of said receiving bore so as to be disposed one behind the other in the direction of said axis and spaced a predetermined distance from each other;
   two press pieces movably mounted in said housing so as to lie opposite corresponding ones of said first and second support means, said two press pieces having respective end faces facing away from said grooves;
   a latching member mounted on said housing so as to be movable between first and second positions in the direction of said pin axis, said latching member and said housing conjointly defining a space at the region of said press pieces;
   an intermediate piece movably mounted in said space between said housing and said latching member so as to be movable toward and away from said end faces of said press pieces;
   abutment means for imparting a force to said intermediate piece when said latching member is moved into said second position so as to cause said intermediate piece to engage and press said press pieces against said plug pin thereby clamping the latter against said first and second support means, respectively, to fix said plug pin in position in said receiving bore; and,
   gap means formed in said wall between said first and second support means so as to cause said plug pin to be braced against only said first and second support means when said press pieces are pressed against said plug pin by said intermediate piece.

* * * * *